(12) United States Patent
Nigam

(10) Patent No.: US 6,761,977 B2
(45) Date of Patent: Jul. 13, 2004

(54) TREATMENT OF SUBSTRATES TO ENHANCE THE QUALITY OF PRINTED IMAGES THEREON USING AZETIDINIUM AND/OR GUANIDINE POLYMERS

(76) Inventor: Asutosh Nigam, 4506 Amiens Ave., Fremont, CA (US) 94555

(*) Notice: Subject to any disclaimer, the term of this patent is extended or adjusted under 35 U.S.C. 154(b) by 0 days.

(21) Appl. No.: 10/264,382

(22) Filed: Oct. 4, 2002

(65) Prior Publication Data

US 2003/0087112 A1 May 8, 2003

Related U.S. Application Data

(63) Continuation of application No. 09/282,542, filed on Mar. 31, 1999.
(60) Provisional application No. 60/082,697, filed on Apr. 22, 1998.

(51) Int. Cl.$^7$ .............................. B32B 15/08; B05D 1/36
(52) U.S. Cl. ................... 428/457; 428/461; 428/464; 428/500; 428/507; 428/511; 427/402; 427/407; 427/409
(58) Field of Search ............................. 428/457, 464, 428/461, 702, 500, 511, 507; 162/164.6; 427/402, 407, 409

(56) References Cited

U.S. PATENT DOCUMENTS

| | | | |
|---|---|---|---|
| 3,993,640 A | 11/1976 | Pickard et al. ............... 536/30 |
| 4,341,887 A | 7/1982 | Buriks et al. ............... 526/263 |
| 4,410,652 A | 10/1983 | Robinson et al. ............. 524/195 |
| 4,439,208 A | 3/1984 | Moser et al. .................. 8/556 |
| 4,520,159 A | 5/1985 | Maslanka ................... 524/606 |
| 4,522,686 A | 6/1985 | Dumas ........................ 162/155 |
| 4,554,181 A | 11/1985 | Cousin et al. .............. 427/261 |
| 4,604,101 A | 8/1986 | Kissling et al. ................ 8/551 |
| 4,689,418 A | 8/1987 | Buriks et al. ............... 548/952 |
| 4,718,918 A | 1/1988 | Heller et al. .................... 8/495 |
| 4,764,585 A | 8/1988 | Heller et al. ................. 528/233 |
| 4,913,705 A | 4/1990 | Schlick et al. ................. 8/532 |
| 5,169,441 A | 12/1992 | Lauzon ....................... 106/416 |
| 5,212,008 A | 5/1993 | Malhotra et al. ............. 428/216 |
| RE34,486 E | 12/1993 | Waldmann ................... 528/422 |
| 5,279,885 A | 1/1994 | Ohmori et al. .............. 428/195 |
| 5,296,541 A | 3/1994 | Swarup et al. .............. 524/558 |
| 5,304,587 A | 4/1994 | Oswald et al. .............. 523/166 |
| 5,318,669 A | 6/1994 | Dasgupta ...................... 62/164 |
| 5,384,368 A | 1/1995 | Date et al. .................. 525/186 |
| 5,510,004 A | 4/1996 | Allen .......................... 162/168 |
| 5,525,664 A | 6/1996 | Miller et al. ................. 524/845 |
| 5,633,300 A | 5/1997 | Dasgupta ...................... 524/55 |
| 5,659,011 A | 8/1997 | Waldmann ................... 528/422 |
| 5,670,242 A | 9/1997 | Asano et al. ................ 428/212 |
| 5,712,027 A | 1/1998 | Ali et al. ..................... 428/212 |
| 6,054,223 A | 4/2000 | Tsuchiya et al. .......... 428/478.2 |
| 6,179,962 B1 | 1/2001 | Brady et al. ................ 62/164.1 |
| 6,197,880 B1 * | 3/2001 | Nigam ........................ 524/845 |
| 6,291,023 B1 * | 9/2001 | Nigam ..................... 427/389.9 |
| 6,478,980 B2 * | 11/2002 | Nigam ....................... 252/8.61 |
| 2003/0062506 A1 * | 4/2003 | Nigam ....................... 252/8.61 |

FOREIGN PATENT DOCUMENTS

| | | |
|---|---|---|
| DE | 19527100 | 1/1997 |
| EP | 0286597 | 10/1988 |
| JP | 61-98580 | 5/1986 |
| JP | 9-254529 | 9/1997 |

* cited by examiner

Primary Examiner—Monique R. Jackson
(74) Attorney, Agent, or Firm—Reed & Eberle LLP; Dianne E. Reed

(57) ABSTRACT

Compositions and methods are provided for improving the quality of images printed on a substrate. The novel image-enhancing compositions contain as an image-enhancing agent (a) an azetidinium polymer, (b) a guanidine polymer, (c) a mixture of an azetidinium polymer and a guanidine polymer, or (d) a copolymer of an azetidinium monomer and a guanidine monomer. When applied to a substrate, the compositions provide for high quality printed images when the treated substrate is printed on with an ink containing a reactive dye capable of reacting with the image-enhancing agent. Images printed on a substrate treated with the image-enhancing compositions of the invention are water-resistant (e.g., water-fast), bleed-resistant, rub-resistant, and/or are characterized by an enhanced chroma and hue.

35 Claims, No Drawings

TREATMENT OF SUBSTRATES TO ENHANCE THE QUALITY OF PRINTED IMAGES THEREON USING AZETIDINIUM AND/OR GUANIDINE POLYMERS

CROSS-REFERENCE TO RELATED APPLICATIONS

This application is a continuation of U.S. patent application Ser. No. 09/282,542, filed Mar. 31, 1999, which claims priority to U.S. provisional patent application No. 60/082,697, filed Apr. 22, 1998, both of which are incorporated herein by reference.

TECHNICAL FIELD

The present invention relates generally to compositions and methods for the treatment of substrates, and more particularly relates to compositions and methods for treating substrates to enhance the quality of images printed thereon. The invention is useful in the treatment of a wide variety of substrate types, including flexible and rigid substrates, porous and nonporous substrates, cellulosic and noncellulosic substrates, and the like.

BACKGROUND

As printing technology advances, manufacturers of many different types of products are faced with the increasingly rigorous demands of their customers for high quality printed images on those products. Such products include, for example, printed textiles, paper, printed polymeric sheets, coatings or films, printed metallic items, and the like.

For example, current textile printing technologies are deficient in meeting modern, time-driven, demand-responsive manufacturing strategies. In general, the conventional method of printing on textiles involves crosslinking a colorant to the cellulosic fiber of the textile itself. This approach is limited in that it relies on processes that involve multiple, time-consuming steps. The types of substrates and colorants that can be used are limited as well. One approach for increasing textile printing speed involves the use of inkjet printing. Inkjet printers are very popular, due at least in part to their reliability, relatively quiet operation, versatility, graphics capability, print quality, and low cost. Moreover, inkjet printers have made possible "on demand" color printing without the need for complicated devices. Because inkjet printing has become so popular in both home and commercial use, several water-soluble inks are available. The inks are typically composed of water and a colorant, usually a dye or pigment dispersion, and often contain a number of additives for imparting certain features to the ink (e.g., improved stability and flow, smear resistance, and the like). Unfortunately, however, using inkjet printing techniques for printing on textiles has met with several problems. First, and in spite of the large number of inkjet inks currently available, inkjet printed images on textiles are often of low quality. For example, the printed images often smear upon handling, exhibit bleed (the intrusion of one color into an adjacent color), are moisture sensitive, and are dull, i.e., colored inks when printed fail to accurately produce the expected hues. Moreover, the printed images are often neither water-fast nor detergent-resistant, resulting in fading of the printed image after washing. Printed textile images with these drawbacks are wholly unacceptable to the textile industry, which requires not only that the image be both water-resistant and detergent-resistant, but also that the colors and hues are those deemed acceptable in the textile field.

In addition, there is a keen demand for paper that can be printed on to provide images of exceptionally high quality, particularly with respect to brightness, clarity, opacity, water-fastness, water resistance, bleed resistance and rub resistance. The customer further demands that paper be amenable to use with a variety of printing techniques, including not only conventional printing techniques, but also "impact-free" printing techniques such as inkjet printing (particularly colored inkjet printing), laser printing, photocopying, and the like.

In response, paper manufacturers have attempted to meet their customers' demands for such high quality paper through a process termed "sizing." "Sizing," which encompasses both "internal sizing" and "external sizing," affects the manner in which colorants and particularly ink interact with the fibers of the paper. "Internal sizing" involves introduction of sizing compositions within the entire fibrous mass at the pulp stage of paper manufacturing (i.e., to the wet pulp, or more specifically, to the prepared papermaking furnish) before the stock is formed into a sheet, resulting in the distribution of the sizing composition within the entire fibrous mass that is subsequently used to produce the flat fibrous paper sheet. "External sizing" (also referred to as surface application, pasting, saturating or coating) involves application of a sizing composition to at least one surface of a fibrous paper sheet, so that the composition is present on or in at least one of the two faces of the fibrous sheet. Various materials have been used as sizing agents, such as conventional and modified starches, polyvinyl alcohol, cellulosic derivatives, gelatin, rosin, proteins such as casein, natural gums and synthetic polymers. Although these materials are effective to various degrees under certain conditions, use of each is associated with certain limitations. For example, it is often necessary to use large amounts of these conventional sizing agents in order to provide paper having the desired properties. However, the opacity and brightness of the paper substrate decrease in direct proportion to the amount of sizing agent applied to the paper. Moreover, as the amount of sizing agent and/or the cost of the sizing agent increases, the cost of producing the paper increases, making high quality papers prohibitively expensive. Certain sizing agents impart relatively poor bleed resistance and water resistance of imprinted inks, and thus must be used with insolubilizing agents to ensure production of a printed paper having satisfactory water resistance.

Use of conventional sizing agents also results in a decrease in the porosity of the final paper substrate; thus, while the sized paper substrate may have the desired brightness and opacity, it may not provide for a printed image having a suitable optical density or color intensity. In addition, as the porosity of the paper increases, the paper becomes less amenable to various handling processes during manufacturing. For example, envelope manufacturers demand that the paper available to them have a relatively low porosity. If the porosity of the paper is too high, the paper is too stiff for handling by automated industrial devices for folding and sorting (e.g., devices of the "suction extractor" type) during envelope production. In contrast to lower porosity papers, high porosity papers also require slower machine speeds, and further require refining and draining operations that have relatively high energy costs.

Coatings have additionally been used to enhance the quality of printed images on paper, albeit with limited success. Regarding other types of substrates, a variety of coating methods and compositions have also been suggested. However, as with textiles and paper, there is not at this time any satisfactory method for improving the quality of images printed on polymeric films, metallic sheets, or the like using water-based inks.

The present invention is directed to the aforementioned need in the art, and provides an efficient, versatile and cost-effective means for treating substrates that can then be printed on to yield high quality, water-resistant printed images. The compositions and methods of the invention are amenable for use with a wide variety of substrate types, and are compatible with conventional manufacturing and post-manufacturing handling processes.

SUMMARY OF THE INVENTION

The present invention features novel image-enhancing compositions for treating a substrate to enhance the quality of images printed thereon, wherein the image-enhancing compositions are composed of an image-enhancing agent selected from one of (a) an azetidinium polymer, (b) a guanidine polymer, (c) a mixture of an azetidinium polymer and a guanidine polymer, and (d) a copolymer of an azetidinium monomer and a guanidine monomer. Substrates can be treated before or during manufacture. Substrates treated with the present image-enhancing compositions can be printed on to yield high quality printed images, particularly when printed on with an ink containing a reactive dye having ionizable and/or nucleophilic groups capable of reacting with the image-enhancing agent. The printed images are bleed-resistant, rub-resistant, water-resistant (e.g., water-fast), and/or are characterized by an enhanced chroma and hue.

It is a primary object of the invention to address the above-mentioned need in the art by providing such an image-enhancing composition that efficiently binds colorant upon printing.

Another object of the invention is to provide a treated substrate that can be printed on to yield an image that is high quality (particularly with respect to optical density and brightness), and that is bleed-resistant, rub-resistant, and water-resistant (e.g., water-fast).

Still another object of the invention is provide a method for treating substrates using the image-enhancing compositions of the invention.

Still an additional object of the invention is to provide a method for printing on a substrate to provide water-resistant (e.g., water-fast) printed images thereon.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

Definitions and Nomenclature:

It must be noted that, as used in the specification and the appended claims, the singular forms "a," "an" and "the" include plural referents unless the context clearly dictates otherwise. Thus, for example, reference to "an image-enhancing agent" in a composition means that more than one image-enhancing agent can be present in the composition, reference to "a polymer" includes combinations of different polymers, and the like.

"Aqueous based ink" refers to an ink composed of an aqueous carrier medium and a colorant, such as a dye or a pigment dispersion. An aqueous carrier medium is composed of water or a mixture of water and one or more water-soluble organic solvents. Exemplary aqueous based ink compositions are described in detail below.

"Colorant" as used herein is meant to encompass dyes, pigments, stains, and the like compatible for use with the image-enhancing compositions of the invention.

The term "colorant-reactive component" as used herein refers to a component (e.g., a chemical moiety) of an image-enhancing agent that is capable of reacting with a selected colorant, particularly a colorant having a nucleophilic and/or ionizable group, to form an image-enhancing agent-colorant complex. The image-enhancing agent-colorant complex is formed through either a covalent, electrostatic, or ionic association between the colorant-reactive component of the image-enhancing agent and the colorant. When an image-enhancing agent having a colorant-reactive component and a selected colorant from an image enhancing agent-colorant complex in the context of a printed image on a substrate, the association between the colorant and the color-reactive component of the image-enhancing agent is effective to impart advantageous qualities to the printed image on the substrate, particularly with respect to water resistance, enhanced optical density, enhanced brightness, and the like.

The term "treating," as used herein to refer to the application of an image-enhancing composition of the invention to a substrate, is intended to include both application of a coating to a substrate surface as well as partial or complete saturation of a substrate with the composition.

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids.

The term "significant", as when used with reference to "significantly enhanced brightness" or "significantly improved water-fastness" generally refers to a difference in a quantifiable, measurable, or otherwise detectable parameter, e.g., optical density, LAB graphs (color sphere), dot spread, bleed through, between the two groups being compared (e.g., untreated versus treated substrates) that is statistically significant using standard statistical tests. For example, the degree of visual wicking or water-fastness of a printed substrate as detected in a print assay may be quantified using standard methods, and the degree of wicking or water-fastness under different conditions can be compared for both treated and untreated substrates to detect statistically significant differences.

The term "fluid resistance" is used herein to describe the resistance of a printed substrate to penetration by a fluid, with the term "water resistance" specifically referring to resistance of a substrate to penetration by water.

The term "water-fast," is used herein to describe a form of water resistance, and which is normally used to refer to the nature of the ink composition after drying on a substrate. In general, "water-fast" means that the dried composition is substantially insoluble in water, such that upon contact with water, the dried ink retains at least about 70%, preferably at least about 85%, and more preferably at least about 95%, of optical density.

The term "bleed resistance" is meant to refer to the retardation of the penetration of water into a substrate, which retardation is associated with creation of a low energy hydrophobic surface at the fiber-water interface which increases the contact angle formed between a drop of liquid and the surface, and thus decreases the wettability. Contact angles have been shown to be sensitive to molecular packing, surface morphology, and chemical constitution of the substrate and any components added thereto.

The term "rub resistance" is normally meant to refer to a characteristic of the ink composition after drying on a substrate, more specifically, the ability of a printed image to remain associated with the substrate upon which it is printed despite application of force (e.g., rubbing) to the printed image. In general, "rub resistant" means that the dried ink composition is substantially resistant to rubbing force so that the dried ink retains at least about 70%, preferably at least about 85%, and more preferably at least about 95%, of optical density after rubbing of the printed image.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkylene" as used herein refers to a difunctional, branched or unbranched saturated hydrocarbon group of 1 to 24 carbon atoms, including without limitation methylene, ethylene, ethane-1,1-diyl, propane-2,2-diyl, propane-1,3-diyl, butane-1,3-diyl, and the like. "Lower alkylene" refers to an alkylene group of 1 to 6 carbon atoms.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing 1 to 6 carbon atoms.

"Halo" or "halogen" refers to fluoro, chloro, bromo or iodo, and usually relates to halo substitution for a hydrogen atom in an organic compound.

The term "polymer" is used herein in its conventional sense to refer to a compound having two or more monomer units, and is intended to include homopolymers as well as copolymers. The term "monomer" is used herein to refer to compounds which are not polymeric.

"Optionally" or "optionally" means that the subsequently described event or circumstance may or may not occur, and that the description includes instances where said event or circumstance occurs and instances where it does not. For example, the phrase "optionally substituted" aromatic ring means that the aromatic ring may or may not be substituted and that the description includes both an unsubstituted aromatic ring and an aromatic ring bearing one or more substituents.

Overview of the Invention:

The present invention is based upon the discovery that a composition containing an image-enhancing agent that is one of (a) an azetidinium polymer, (b) a guanidine polymer, (c) a mixture of an azetidinium polymer and a guanidine polymer, and (d) a copolymer of an azetidinium monomer and a guanidine monomer, is effective in treating a wide variety of substrates to significantly improve the quality of images printed thereon. Substrates that have been treated with an image-enhancing composition of the invention can be printed on to yield high quality printed images having improved color fastness (the printed images do not run when exposed to moisture) as a result of the substantially non-reversible binding of aqueous colorants to the image-enhancing agent present in the image-enhancing composition. Substrates that are treated with the compositions of the invention and then printed on thus provide images that can be characterized as "water-resistant" or "water-fast" due to the characteristics of the printed image following exposure to water. The printed images are also bleed-resistant as well as rub-resistant.

The treated substrates of the invention can be used in conventional printing, or with digital printing (particularly inkjet printing, including drop-on-demand and continuous printing) to provide highly brilliant, printed images that are significantly improved in color quality, for example, with respect to chroma and hue, when compared to untreated substrates or conventionally treated substrates. The present compositions and their methods of use according to the present invention thus provide a number of advantages over conventional textile treatment compositions, paper coating and sizing compositions, and the like.

The image-enhancing compositions, methods of treatment using the image-enhancing compositions described herein, and other features of the invention are described in greater detail below.

Image-Enhancing Compositions:

The image-enhancing compositions of the invention are composed of an image-enhancing agent selected from the group consisting of (a) an azetidinium polymer, (b) a guanidine polymer, (c) a mixture of an azetidinium polymer and a guanidine polymer, and (d) a copolymer of an azetidinium monomer and a guanidine monomer. In general, the image-enhancing agents have a colorant-reactive component that is capable of reacting with a selected colorant, particularly a colorant having a nucleophilic and/or ionizable group, to form an image-enhancing agent-colorant complex through a covalent, electrostatic, or ionic association. The association of the image-enhancing agent and colorant imparts water resistance (e.g., water-fastness) and other desirable characteristics to the printed image on the substrate surface. In addition to the image-enhancing agent, the image-enhancing compositions can include components such as film-forming binders, pigments, and other additives.

The image-enhancing compositions of the invention can be readily prepared from commercially available starting materials and/or reagents, are compatible with additional binders or additives, can be used with a variety of substrates, are compatible with a variety of printing methods, including conventional and digital printing methods (particularly inkjet printing, including drop-on-demand printing and continuous printing), and can also be used with existing commercial manufacturing methods and equipment, including, for example, textile and paper production processes and equipment. The image-enhancing composition is inexpensive to prepare, and relatively small amounts are required to provide a treated substrate having the advantageous features described herein. The image-enhancing compositions of the invention are also easy to handle due to their solubility in water (the active components, the image-enhancing agents, are hydrophilic polymers), and do not require the use of large volumes of organic solvents. The novel image-enhancing compositions herein also possess good film-forming properties.

The treated substrates prepared using the compositions of the invention react rapidly with a number of aqueous based colorants. Furthermore, because colorants react quickly with the image-enhancing agent in the present compositions, the printed-on, treated substrate does not require a separate curing step, but rather is fast-drying. This fast-drying characteristic provides for printed images that are "non-sticky," thus allowing the printed substrate to be handled immediately after printing. In addition to their water resistance, substrates treated with an image-enhancing composition of the invention are highly bleed-resistant (as evidenced by small dot size measurements, i.e., less wicking action) and rub-resistant.

The various components of the image-enhancing composition will now be described.

Image-Enhancing Agents

Image-enhancing agents in the image-enhancing compositions of the invention generally comprise an azetidinium polymer, a guanidine polymer, a copolymer of an azetidinium monomer and a guanidine monomer, or a mixture of an azetidinium polymer and a guanidine polymer. The image-enhancing agent typically represents approximately 5% to 95% of the image-enhancing composition, preferably approximately 10% to 95% of the image-enhancing composition, based upon total solids weight of the composition after drying.

(A) Azetidinium Polymers

In one embodiment, the image-enhancing agent is an azetidinium polymer. An "azetidinium polymer" is a polymer comprised of monomeric subunits containing a substituted or unsubstituted azetedine ring (i.e., a four membered nitrogen-containing heterocycle). In general, the azetidinium polymers useful herein are composed of monomer units having the structural formula (I):

$$\left[ \begin{array}{c} R^1 \;\; R^2 \\ \diagdown \!\!\! \overset{+}{N} \!\!\! \diagup \;\; X^- \\ Y^1\!-\!CH \diagup \diagdown CH\!-\!Y^3 \\ | \\ Y^2 \end{array} \right] \quad (I)$$

in which $R^1$ and $R^2$ are independently lower alkylene, $X^-$ is an anionic, organic or inorganic counterion, and $Y^1$, $Y^2$ and $Y^3$ are selected from the group consisting of hydrogen, hydroxyl, halo, alkoxy, alkyl, amino, carboxy, acetoxy, cyano and sulfhydryl. Preferred such polymers are wherein $R^1$ and $R^2$ are methylene, $X^-$ is selected from the group consisting of halide, acetate, methane sulfonate, succinate, citrate, malonate, fumarate, oxalate and hydrogen sulfate, $Y^1$ and $Y^3$ are independently hydrogen or lower alkyl, and $Y^2$ is hydrogen or hydroxyl. In particularly preferred azetidinium polymers herein, $Y^1$ and $Y^3$ are hydrogen and $Y^2$ is hydroxyl.

The azetidinium polymer may be a homopolymer, or it may be a copolymer, wherein one or more non-azetidinium monomer units are incorporated into polymer structure. Any number of comonomers may be employed to form suitable azetidinium copolymers for use herein; however, a particularly preferred azetidinium copolymer is aminoamide azetidinium. Further, the azetidinium polymer may be essentially straight-chain or it may be branched or crosslinked.

Azetidinium polymers can associate with colorant in two different ways. First, the azetidinium polymer can associate with colorant through an ionic interaction, where the colorant provides anionic groups, such as carboxy or sulfonate, that can ion-exchange with the polymer counterions ($X^-$ in Formula (I), above), thus fixing the colorant to the treated substrate via an electrostatic-type interaction. Second, nucleophilic groups present within the colorant can react with the azetidinium groups of the polymer via a ring-opening reaction. A characteristic ring-opening reaction of an azetidinium polymer of the invention may be illustrated as follows:

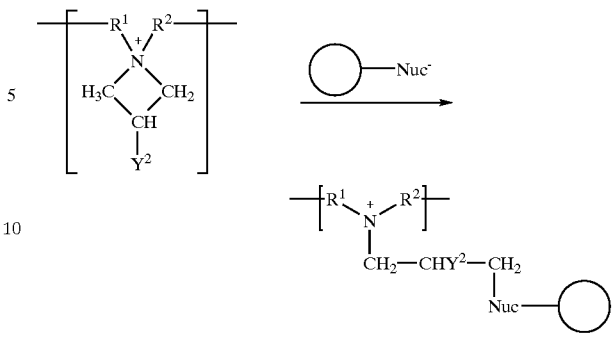

The colorant thus covalently bonds to the azetidinium polymer to form an azetidinium polymer-colorant complex. Colorant thus applied to a treated substrate is rapidly and irreversibly bound to the substrate.

The percentage of reactive azetidinium groups in the polymer can be adjusted in a controlled manner. Azetidinium groups are insensitive to pH change; however, such groups are highly sensitive to the presence of anionic and nucleophilic species. In some cases, it may be desirable to adjust the reaction conditions used to prepare the azetidinium polymer (e.g., by raising the pH) to generate anionic groups within the polymer, which then participate in intramolecular crosslinking.

A preferred azetidinium polymer for use in the present invention is shown in Formula (II)

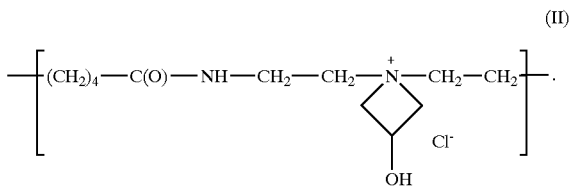

Commercially available such polymers include "AMRES®," available from Georgia Pacific, Resins, Inc., Atlanta, Ga., "KYMENE®," from Hercules, Inc., Wilmington, Del., and "Polycup®," also from Hercules, Inc. These azetidinium polymers are generally referred to as poly(aminoamide)-epichlorohydrin (PAE) resins; such resins are typically prepared by alkylating a water-soluble polyamide containing secondary amino groups with epichlorohydrin. Other suitable azetidinium polymers will be known to those skilled in the art and/or are described in the pertinent texts, patent documents, and literature references; see, for example, Moyer, et al., in *WET STRENGTH IN PAPER AND PAPERBOARD*, Tappi Monograph Series No. 29, Tappi Press, Ch. 3, p. 33–37 (1965); Chan, in *TAPPI WET AND DRY STRENGTH SHORT COURSE*, Tappi Press, Atlanta, Apr. 13–15, 1988; and Espy, in *WET STRENGTH RESINS AND THEIR APPLICATION*, Ed., Lock L. Chan, Tappi Press, Atlanta, Ga. (1994).

(B) Guanidine Polymers

In another embodiment, the image-enhancing agent is a guanidine polymer, also termed a "polyguanidine.". The guanidino group is extremely basic, possessing a pKa of about 12–13. Polyguanidines for use in the invention are typically provided as acid salts wherein the imine nitrogen atoms are for the most part in protonated form.

In general, guanidine polymers useful as image-enhancing agents in the present invention are either homopolymers or copolymers. All guanidine polymers herein are comprised of recurring monomer units having the structural formula

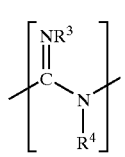

(III)

wherein $R^3$ is hydrogen or lower alkyl and $R^4$ is hydrogen, alkyl, alkoxy, or hydroxyl-substituted alkoxy. Preferably, $R^3$ and $R^4$ are hydrogen. Particularly preferred guanidine polymers for use herein are comprised of monomer units having the structural formula (IV)

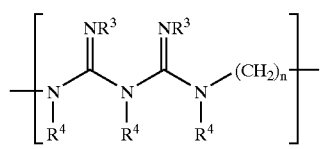

(IV)

wherein n is an integer in the range of 1 to 10 inclusive, $R^3$ is hydrogen or lower alkyl and $R^4$ is hydrogen, alkyl, alkoxy, or hydroxyl-substituted alkoxy. Preferably, $R^3$ and $R^4$ are hydrogen.

A particularly preferred guanidine polymer for use in the methods and compositions of the invention has the structure of formula (IV) wherein $R^3$ and $R^4$ are H and n is 6 (3,12-diimino-2,4,11,13-tetraazatetradecanediimidamide), available commercially as "BAQUACIL®" and "VANTOCIL®," from Zeneca, Inc.

Guanidine polymers of the invention react electrostatically with anionic groups present in the dye via ion-exchange type interactions, to rapidly and irreversibly bind anionic type dyes to print substrates treated with such polymers.

(C) Mixtures of Azetidinium Polymers and Guanidine Polymers

In another embodiment, the image-enhancing agent comprises a mixture of an azetidinium polymer and a guanidine polymer. The two polymers may be present in any suitable ratio relative to one another. The relative amounts of polyguanidine and polyazetidinium can range from about 0.05% polyguanidine/99.95% polyazetidinium to 0.05% polyazetidinium/99.95% polyguanidine. The actual relative amounts of polyguanidine and polyazetidinium will vary according to the composition of the ink to be used (e.g., the nature of the colorant in the ink), the nature of the substrate, and other factors affecting the use of the polymers, such as the relative market price for each polymer. In general, it is preferable to use a smaller amount of guanidine relative to azetidinium.

In this embodiment, it is important that the pH of the image-enhancing composition be acidic, as the composition tends to gel at basic pH. If necessary, then, an acid should be added to the composition to ensure that the pH is below 7.0, preferably less than about 5.5, and most preferably in the range of about 1.0 to 5.5. Suitable acids include sulfuric acid, hydrochloric acid, acetic acid, and the like.

Although it will be appreciated that any of a number of azetidinium or guanidine polymers can be used to prepare the treated substrates and image-enhancing compositions described herein, a preferred polymer is a poly (aminoamide)-azetidinium polymer, e.g., a polyazetidinium chloride-based polymer, such as a polyamide-polyamine-epichlorohydrin resin.

(D) Copolymers of Azetidinium Monomers and Guanidine Monomers

In another embodiment, the image-enhancing agent is a copolymer of an azetidinium monomer unit and a guanidine monomer unit. In general, the azetidinium monomer unit has the structural formula (I)

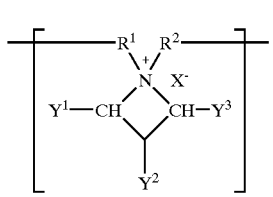

(I)

in which $R^1$ and $R^2$ are independently lower alkylene, $X^-$ is an anionic, organic or inorganic counterion, and $Y^1$, $Y^2$ and $Y^3$ are selected from the group consisting of hydrogen, hydroxyl, halo, alkoxy, alkyl, amino, carboxy, acetoxy, cyano and sulfhydryl. Preferred monomers are wherein $R^1$ and $R^2$ are methylene, $X^-$ is selected from the group consisting of halide, acetate, methane sulfonate, succinate, citrate, malonate, fumarate, oxalate and hydrogen sulfate, $Y^1$ and $Y^3$ are independently hydrogen or lower alkyl, and $Y^2$ is hydrogen or hydroxyl. In particularly preferred azetidinium monomers, $Y^1$ and $Y^3$ are hydrogen and $Y^2$ is hydroxyl. The guanidine monomer has the structural formula (III)

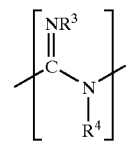

(III)

or the structural formula (IV)

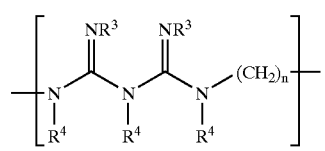

(IV)

wherein $R^3$, $R^4$ and n are as defined earlier herein.

The ratio of azetidinium monomers to guanidine monomers in the copolymer, as well as the distribution of each monomer type in the copolymer, can be varied according to a number of factors, and may be, for example, tailored for use with specific colorants having certain types of ionic and/or nucleophilic groups. The precise composition of the copolymer may also be varied to best accommodate the nature of the substrate to be treated.

Film-Forming Binders

The image-enhancing compositions of the invention preferably include a film-forming binder. By "film-forming binder" is meant a substance that provides for improved strength of a substrate upon application of the substance to the substrate. "Film-forming binders" used in connection with the image-enhancing compositions of the invention include any film-forming binder that is compatible with the selected image-enhancing agent and other components of the image-enhancing composition. Exemplary film-forming binders include, but are not necessarily limited to: polysaccharides and derivatives thereof, e.g., starches, cellulosic polymers, dextran and the like; polypeptides (e.g., collagen and gelatin); and synthetic polymers, particularly synthetic vinyl polymers such as poly(vinyl alcohol), poly(vinyl phosphate), poly(vinyl pyrrolidone), vinyl-pyrrolidone-vinyl acetate copolymers, vinyl alcohol-vinyl acetate copolymers, vinyl pyrrolidone-styrene copolymers, and poly (vinyl amine), and cationic film-forming binders such as quaternized vinyl pyrrolidone-dimethylaminoethyl-methacrylate copolymer, dimethylaminoethyl-methacrylate-co-methyl methacrylate, polydiallyldimethyl ammonium chloride and quaternized aminoacrylate polymers.

Polysaccharide binders: Starches, as noted above, represent one category of suitable film-forming binders for use herein. Suitable starches may be any of a variety of natural, converted, and synthetically modified starches. Exemplary starches include, but are not necessarily limited to, starch (e.g., SLS-280 (St. Lawrence Starch)), cationic starches (e.g., Cato-72 (National Starch), hydroxyalkylstarch, wherein the alkyl has at least one carbon atom and wherein the number of carbon atoms is such that the material is water soluble, preferably from about 1 to about 10 carbon atoms, such as methyl, ethyl, propyl, butyl, or the like (e.g., hydroxypropyl starch #02382 (PolySciences, Inc.), hydroxyethyl starch #06733 (PolySciences, Inc.), Penford Gum 270 and 280 (Penford), and Film-Kote (National Starch)), starch blends (see, e.g., U.S. Pat. No. 4,872,951, describing a blend of cationic starch and starch treated with an alkyl or alkenyl succinic anhydride (ASA), preferably 1-octenyl succinic anhydride (OSA)), and the like. The film-forming binder can also be a synthetically produced polysaccharide, such as a cationic polysaccharide esterified by a dicarboxylic acid anhydride (see, e.g., U.S. Pat. No. 5,647,898). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like). Still additional film-forming binders of this type include dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), and gelatin.

Additional exemplary film-forming binders include resins (e.g., such as formaldehyde resins such as melamine-formaldehyde resin, urea-formaldehyde resin, alkylated urea-formaldehyde resin, and the like), acrylamide-containing polymers (e.g., poly(acrylamide), poly(N,N-dimethyl acrylamide), and the like), poly(alkyleneimine)-containing polymers (e.g., poly(ethyleneimine), poly(ethyleneimine) epichlorohydrin, alkoxylated poly (ethyleneimine), and the like), polyoxyalkylene polymers (e.g., poly(oxymethylene), poly(oxyethylene), ethylene oxide/propylene oxide copolymers, ethylene oxide/2-hydroxyethyl methacrylate/ethylene oxide and ethylene oxide/hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like), etc.

Any of the above exemplary film-forming binders can be used in any effective relative amounts, although typically the film-forming binder, if present, represents approximately 1 wt. % to 40 wt. %, preferably 1 wt. % to 25 wt. %, most preferably 1 wt. % to 15 wt. % of the present image-enhancing composition, after drying on a substrate. Starches and latexes are of particular interest because of their availability and applicability to a variety of substrates.

Other Components of the Image-Enhancing Composition

Additional components of the image-enhancing composition may include, but are not necessarily limited to, inorganic fillers, anti-curl agents, surfactants, plasticizers, humectants, UV absorbers, light fastness enhancers, polymeric dispersants, dye mordants, optical brighteners, and leveling agents, as are commonly known in the art. Illustrative examples of such additives are provided in U.S. Pat. Nos. 5,279,885 and 5,537,137. The image-enhancing compositions may also include a crosslinking agent such as zirconium acetate, ammonium zirconium carbonate, or the like, for intramolecular and/or intermolecular crosslinking of image-enhancing agent, and/or a chelating agent such as boric acid. Of particular interest with respect to the treatment of paper substrate are components that provide for a coated substrate having a non-glossy, matte, or glossy surface; as will be appreciated by those skilled in the art, incorporation of a pigment (e.g., silica, calcium carbonate) will generally give rise to a non-glossy surface, while a glossy surface will result in the absence of a pigment (or in the presence of only a small amount of pigment).

The image-enhancing composition may also contain a colorant, e.g., a pigment, dye or other colorant, to provide for whiteness or color of the substrate; this is particularly true for use in sizing or coating paper. Additional components that may be desirable to include in the compositions of the invention, particularly when the compositions are to be used to treat paper, are found in *PAPER CHEMISTRY, 2$^{nd}$ Edition*, Roberts, ed., Blackie Academic & Professional, Glasgow, UK (1994). The aforementioned reference also provides guidance for the use of such components and a general description of paper chemistry.

The image-enhancing composition of the invention is preferably provided in an aqueous liquid vehicle, although small amounts of a water-soluble organic solvent may be present. The aqueous liquid vehicle will generally be water, although other nonorganic compounds which are either water soluble or water miscible may be included as well. It may on occasion be necessary to add a solubilizing compound during preparation of the image-enhancing composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 20 wt. % of the composition, and in most cases will represent not more than about 10 wt. % of the composition.

Substrates and Treatment Thereof:

The compositions and methods of the invention are generally applicable to a wide variety of substrates to improve the quality of images printed on the substrate surface. The substrates may be flexible or rigid, porous or nonporous, and cellulosic or noncellulosic. Suitable substrates with which the present compositions and methods can be used include, but are not limited to, textiles, paper, polymeric films, metallic sheets, and the like.

Treatment of Textile Substrates

Suitable textile substrates for use with the compositions and methods of the invention include textiles having natural, synthetic, cellulose-based, or non-cellulose-based fibers or any combination thereof. Exemplary textile substrates include, but are not limited to, textiles having hydroxy group-containing fibers such as natural or regenerated cellulosic fibers (cotton, rayon, and the like); nitrogen group-containing fibers such as polyacrylonitrile; natural or synthetic polyamides (including wool, silk, or nylon); and/or fibers having acid-modified polyester and polyamide groups. The textile substrates may be additionally pre-treated or after-treated with resins or other substances compatible with the image-enhancing compositions and methods of the invention, and may be finished or unfinished. The textile substrate may also be sized prior to application of the present image-enhancing compositions. Alternatively, the present image-enhancing compositions may be incorporated into an external sizing process and composition.

The fibers of the textile substrate may be in any suitable form compatible with the printing process to be used, e.g., loose yarns, fabrics, and the like. Fabrics, however, are a convenient and preferred form. The fibers may be blended with other fibers that are susceptible to treatment with a composition of the invention, or with fibers that may prove less susceptible to such treatment.

Treatment of textile substrates with the image-enhancing compositions of the invention can be carried out using any of a number of conventional textile coating and/or treatment processes commonly employed in the art. In general, the image-enhancing composition is applied to the textile substrate to provide a treated textile substrate in a manner that leaves the image-enhancing agent physically and chemically accessible to inks for reaction of the colorant-reactive image enhancing agent within the colorant contained in the ink. The term "treatment" as used herein encompasses both surface coating and infiltration of the textile to some degree, so long as, in the latter case, the image-enhancing agent is still accessible to colorant for printing.

The amount of image-enhancing composition applied to the textile substrate will vary with a number of factors, including the absorptive nature of the substrate, the ink to be used for printing, the printing method, and the like. In general, the image-enhancing composition is applied in an amount representing approximately 0.5 wt. % to 20 wt. % of the textile substrate after drying. As will be appreciated by those skilled in the art, the compositions of the invention are applied by any suitable means, which may include continuous processes, application as a continuous film, padding, dipping, spraying, foam application, exhaust processes, or by using a rod, roll, flexopress, blade, or air-knife coater.

Additional information concerning treatment of textile substrates using compositions and methods such as those described herein may be found in U.S. patent application Ser. No. 09/282,753, entitled "Method and Composition for Textile Printing" (Nigam et al.), filed on even date herewith, now issued as U.S. Pat. No. 6,291,023.

Treatment of Paper

The image-enhancing compositions of the invention can be used to treat a paper substrate, for example in a coating or sizing process. The term "paper" is meant to encompass a substrate based on cellulosic fibers; synthetic fibers such as polyamides, polyesters, polyethylene, and polyacrylic fibers; inorganic fibers such as asbestos, ceramic, and glass fibers; and any combination of cellulosic, synthetic, and inorganic fibers. Paper substrates that can be treated using the compositions of the invention may be of any dimension (e.g., size or thickness) or form (e.g., pulp, wet paper, dry paper, etc.). The paper may or may not have been sized prior to treatment according to the methods of the invention; that is, the present compositions can be applied to paper having either a pretreated surface or a surface that has not been treated or coated. The paper substrate is preferably in the form of a flat or sheet structure, which structure may be of variable dimensions. "Paper" is meant to encompass printing paper (e.g., inkjet printing paper, etc.), writing paper, drawing paper, and the like, as well as board materials such as cardboard, poster board, Bristol board, and the like.

Paper Coating

The image-enhancing composition may be applied as a coating on sized paper either as a pretreatment (i.e., prior to printing), simultaneously with printing, or as an after-treatment. As a paper coating, the compositions of the invention are applied to sized paper in quantities suitable to provide the desired characteristics of an image printed on the paper surface, including bleed resistance, water resistance (e.g., water-fastness), etc. Typical amounts of image-enhancing composition to be applied as a top coating, on sized paper, generally range from about fifty to about five hundred pounds per ton of paper substrate. Processes for coating pre-sized paper substrates are well known in the art, and can be performed either on-machine, as part of the initial paper manufacturing process, or off-machine, subsequent to completion of paper manufacture. Generally, coating is accomplished by dip coating, reverse roll coating, extrusion coating, saturation, and the like. However, where the image-enhancing composition is applied as a coating on-machine, in order to achieve acceptable manufacture speeds of about 100 to 3000 ft./per minute, it is recommended that the weight of the sized paper base be greater than 30 grams per square meter. When the final product is to exhibit gloss at a satisfactory level (generally greater than 50), the base sheet, before it receives the coating, should retard rapid drainage of the water or of the coating into the fibrous substrate.

Additional information concerning the coating of sized paper with compositions and methods such as those described herein may be found in U.S. patent application Ser. No. 09/282,537, entitled "Method and Composition for Coating Pre-Sized Paper" (Nigam et al.), filed on even date herewith, now issued as U.S. Pat. No. 6,197,880.

Paper Sizing

The image-enhancing compositions of the invention can also be used to treat paper that has not been sized; in this embodiment, then, the compositions represent paper "sizing" compositions. The present image-enhancing compositions can be used in either an internal sizing process or in an external sizing process, although use in external sizing is preferred. "Internal sizing" involves introduction of a sizing composition at the pulp stage of paper manufacturing, resulting in the distribution of the composition within the fibrous mass subsequently used to produce a fibrous paper sheet. "External sizing" involves application of a sizing composition to a surface of a paper sheet, so that the sizing composition is present on or in at least one of the two faces of the paper. External sizing also saturates the paper to various extents depending on the degree of internal sizing.

Exemplary external sizing techniques include, but are not necessarily limited, to, size press treatment, dip coating, reverse roll coating, extrusion coating, and the like. For example, the sizing composition can be applied with a size press by dip coating and can be applied by solvent extrusion. The size press can be a sheet-fed size press or a size press employing a continuous web, preferably a continuous web size press. Generally, in a sizing process, the image-enhancing compositions of the invention are applied in amounts ranging from about 10 to 500, preferably 30 to 500, pounds per ton of substrate.

Additional information concerning the sizing of paper with compositions and methods such as those described herein may be found in U.S. patent application Ser. No. 09/282,595, entitled "Method and Composition for the Sizing of Paper Using Azetidinium and/or Guanidine Polymers" (Nigam et al.), filed on even date herewith.

Other Substrates

Other substrates that may be treated with the image-enhancing composition of the invention include, but are not limited to: polymeric substrates such as films, sheets, coatings, and solid blocks, comprised of, for example, polyesters (including "MYLAR" flexible film), vinyl polymers, polysulfones, polyurethanes, polyacrylates, polymidies, and the like; metallic substrates such as films, sheets, coatings, foils, and solid blocks, comprised of, for example, aluminum, brass, copper, or the like; inorganic substrates, particularly films, sheets, coatings, and solid blocks, comprised of, for example, glass, metal oxides, silicon-containing ceramics, and the like; and laminates such as a paper/polymeric film or paper/metal foil laminate. It should be emphasized that the nature of the substrate is not critical; rather, it is the image-enhancing treatment of the invention that is key, as any substrate treated with the image-enhancing composition of the invention can be printed on to yield a high quality printed image.

Method for Providing Water-Resistant Images on Treated Substrates:

The invention also features a method for providing a water-resistant (e.g., water-fast) printed image on a substrate surface by first applying to the substrate surface an image-enhancing composition of the invention and then applying a colorant to the treated substrate, where the colorant contains reactive ionizable and/or nucleophilic groups capable of reacting with the image-enhancing agent in the image-enhancing composition, i.e., the azetidinium polymer, the guanidine polymer, or the like.

In general, aqueous inks are used in the preparation of a printed image on the treated substrates of the invention. The aqueous ink may be any suitable ink having a colorant, e.g., a pigment, dye, or stain, having one or more reactive groups suitable for reacting, either covalently or ionically, with a colorant-reactive component of the image-enhancing agent present on the treated substrate. The selection of the specific ink and colorant will vary with the colorant-reactive component of the image-enhancing agent. For example, when the colorant-reactive component is an azetidinium group, the colorant preferably has a nucleophilic group for reaction with the azetidinium group. Thus, preferred colorants for use in printing on a substrate having an azetidinium polymer in the applied image-enhancing composition are those containing one or more nucleophilic moieties, e.g., an amino, carboxy, sulfonato, thiosulfonato, cyano, hydroxy or sulfido group or the like. Preferred colorants for use in printing on a substrate treated with a guanidine polymer are those containing an anionic group, e.g., having a carboxy, sulfonato, thiosulfonato, cyano, halo, or phosphonato group or the like.

The inks used in conjunction with the treated substrates of the invention may be inkjet inks. Water-soluble colorants in the inkjet ink may be acid dyes, direct dyes, basic dyes or dispersive dyes; preferred dyes are described in U.S. Pat. Nos. 5,425,805, 5,537,137, and 5,441,561.

The selection of the aqueous based ink will depend upon the requirements of the specific application, such as desired surface tension, viscosity, drying time, the type of substrate upon which the ink is to be applied (printing medium), and the like. The aqueous liquid vehicle of inks suitable for use in the invention will generally be water, although other nonorganic compounds which are either water soluble or water miscible may be included as well. The colorant may be dissolved, dispersed or suspended in the aqueous liquid vehicle, and is present in an amount effective to provide the dried ink with the desired color and color intensity.

In some instances, the dye is contained in a carrier medium composed of ink and a water soluble organic solvent. For applications utilizing such a carrier medium, representative solvents include polyols such as polyethylene alcohol, diethylene glycol, propylene glycol, and the like. Additional solvents are simple alcohols such as ethanol, isopropanol and benzyl alcohol, and glycol ethers, e.g., ethylene glycol monomethyl ether, diethylene glycol monoethyl ether. Representative examples of water soluble organic solvents are described in U.S. Pat. No. 5,085,698 and U.S. Pat. No. 5,441,561.

Preferred colorants contained in the inks useful with the invention are dyes, including azo or "direct" dyes as well as dyes containing acidic groups (e.g., carboxylate, phosphonate or sulfonate moieties), basic groups (e.g., unsubstituted amines or amines substituted with 1 or 2 alkyl, typically lower alkyl, groups), or both. Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, Inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR-N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.).

Printed Substrates:

The invention also features a printed substrate produced using the methods and compositions described herein. The printed, treated substrate of the invention can be produced by any of a variety of printing techniques, including inkjet printing, laserjet printing, photocopying, and the like. In general, the printing process involves applying, in an image-wise pattern, an aqueous recording liquid to a substrate that has been treated with an image-enhancing composition of the invention. Inkjet printing processes are well known in the art; see, for example, U.S. Pat. Nos. 4,601,777; 4,251,824; 4,410,899; 4,412,224; and 4,532,530.

Some substrates treated with the image-enhancing compositions of the invention, particularly paper substrates, can also be printed on using printing and/or copying processes that require dry or liquid electrophotographic-type developers, such as electrophotographic processes, ionographic process, and the like. The treated substrates of the invention can also be printed on using a process for generating images that involves generating an electrostatic latent image on an imaging member in an imaging apparatus, developing the latent image with a toner, and transferring the developed image to a treated substrate of the invention. Electrophotographic processes are known in the art; see, e.g., U.S. Pat. No. 2,297,691. Ionographic and electrographic processes are also well known in the art; see, e.g., U.S. Pat. Nos. 3,611,419; 3,564,556; 4,240,084; 4,569,584; 2,919,171; 4,524,371; 4,619,515; 4,463,363; 4,254,424; 4,538,163; 4,409,604; 4,408,214; 4,365,549; 4,267,556; 4,160,257; and 4,155,093.

The treated substrates of the invention can also be printed on using a variety of other printing and imaging processes, such as offset printing, printing with pen plotters, handwriting with ink pens, and the like.

Experimental

The following examples are put forth so as to provide those of ordinary skill in the art with a complete disclosure and description of how to prepare and use the compounds disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in EC and pressure is at or near atmospheric.

Also, in these examples, unless otherwise stated, the abbreviations and terms employed have their generally accepted meanings. Abbreviations and tradenames are as follows (note that suppliers of each material are indicated as well):

Amres855=azetidinium polymer (12.5% in water, Georgia Pacific);
Gum 280=starch (Penford Gum 280, Penford);
HS30=azetidinium polymer (30% in water, Georgia Pacific);
IPA=isopropyl alcohol
Jetcoat 20=25% calcium carbonate in water (Specialty Minerals);
Kymene=azetidinium polymer (Hercules);
PC, Polycup 172=azetidinium polymer (Polycup);
Polectron=styrene/poly(vinyl pyrrolidone) copolymer (Polectron 430, ISP Technologies);
PVOH=polyvinyl alcohol (Airvol 523S, Air Products);
Sif=fumed silica (Aerosil MOX 170, Air Products);
Sip=precipitated silica (FK310, Degussa);
SMA=styrene-maleic anhydride copolymer (Georgia Pacific);
Surfinol S420 and F585=surfactants (Air Products);
Surfinol DF66=defoaming agent (Air Products);
Tinopal=brightener (Ciba Additives);
Vantocil=poly(iminoimidocarbonylhexamethylene hydrochloride, 20% aqueous solution (Vantocil IB, Zeneca, Inc.);
W32=leveling agent (Carboflow W32, B. F. Goodrich).

All patents, patent applications, journal articles and other references mentioned herein are incorporated by reference in their entireties.

EXAMPLE 1

Polyazetidinium-Based Image-Enhancing Compositions

The following tables summarize exemplary image-enhancing compositions prepared in accordance with the invention, wherein the image-enhancing agent is an azetidinium polymer.

TABLE 1

| Formulation No. | Amres855 | PC | ISP937 | GQ755 | PVOH | IPA (ml) | W32 (ml) | Tinopal (mg) | NMP | Surfinol | Surfinol DF66 |
|---|---|---|---|---|---|---|---|---|---|---|---|
| 14b | | 5.5 | 2.0 | | 2.5 | | | | | | |
| 16a | 7.0 | 2.0 | 1.0 | | | | | | | | |
| 21a | 4.0 | 6.0 | | | | | | | | | |
| 24b | | 8.0 | 1.0 | | 1.0 | | .25 | 400 | | | |
| 27b | | 8.0 | 1.0 | | 1.0 | | | | | | |
| 30a | | 8.5 | 0.5 | | 1.0 | | | | | | |
| 34a | | 7.0 | | 2.0 | 1.0 | | | | | | |
| 38b | | 7.0 | | 2.0 | 1.0 | 5 | 1 | | | S 420/2 ml | |
| 45b | | 7.0 | | 2.0 | 1.0 | | | | 2 | FS 85/2 ml | |
| 53c | | 6.0 | | 2.0 | 2.0 | 2 | | 50 | 1.75 | FS 85/1.75 ml | 1–2 drops |
| 54a | | 5.0 | | 3.0 | 2.0 | 4 | | 150 | 1.75 | FS 85/1.75 ml | 1–2 drops |
| 55c | | 7.0 | | 2.0 | 1.0 | 4 | | 250 | 1.75 | FS 85/1.75 ml | 1–2 drops |
| 57a | | 4.0 | | 4.0 | 2.0 | 4 | | 250 | 1.75 | FS 85/1.75 ml | 1–2 drops |
| 69b | 4.0 | | | 4.0 | 2.0 | 4 | | 250 | 1.75 | FS 85/1.75 ml | 1–2 drops |

TABLE 2

POLYAZETIDINIUM-BASED COMPOSITIONS

| Formulation No. | Starch (Gum 280) | Azetidinium ("Amres") | Binder (PVOH) | Styrene/PVP ("Polectron") | Pigment 1:4 Sif:Sip | % Solids | Viscosity, cP | pH |
|---|---|---|---|---|---|---|---|---|
| 84-1 | 53 | 20 | 7.0 | | 20.0 | 14.5 | | |
| 85-1 | 52.5 | 20 | 7.0 | | 20.0 | 14.6 | | |
| 74-2 | 22 | 38 | 8.0 | | 32.0 | 13.3 | | |
| 74-3 | 22 | 40 | 10.0 | | 28.0 | 13.3 | 335 | 3.82 |
| 74-4 | 10 | 50 | 10.0 | | 25.0 | 13.3 | | |
| 79-1 | 13 | 50 | 11.0 | | 26.0 | 16.3 | | 3.75 |
| 71-2 | 22 | 36 | | 9.4 | 32.8 | 25.3 | | 3.74 |
| 76-1 | 22 | 38 | 6.0 | 2.0 | 32.0 | 13.3 | 348 | 3.73 |
| 76-2 | 22 | 36 | 6.0 | 4.0 | 32.0 | 13.3 | | |
| 74-1 | 22 | 33 | 8.0 | 5.0 | 32.0 | 13.3 | 479 | 3.86 |
| 76-3 | 22 | 34 | 6.0 | 6.0 | 32.0 | 13.3 | 286 | 3.73 |
| 77-3 | 22 | 35 | 5.0 | 6.0 | 32.0 | 13.3 | | |
| 77-2 | 22 | 34 | 5.0 | 7.0 | 32.0 | 13.3 | 250 | 3.73 |
| 72-2 | 22 | 33 | 5.0 | 8.0 | 32.0 | 23.1 | | 3.74 |
| 78-2 | 22 | 33 | 5.0 | 8.0 | 32.0 | 14.1 | 667 | 4.0 |
| 77-4 | 22 | 38 | 10.0 | 10.0 | 20.0 | 13.1 | | 3.79 |
| 79-2 | 35 | 10 | 10.0 | 10.0 | 35.0 | 18.8 | | 4.10 |
| 77-1 | 27.5 | 47.5 | 12.5 | 12.5 | | 10.8 | | 3.75 |
| 78-1 | 22 | 33 | 5.0 | 8.0 | 32 | 15.4 | 182 | 6.70 |
| 90-1 | 23 | 30 | 10.0 | | 35 | 14.5 | | |
| 90-2 | 23 | 30 | 10.0 | | 35 | 14.7 | | |
| 90-3 | 23 | 30 | 10.0 | | 35 | 13.4 | | |
| 90-4 | 23 | 30 | 10.0 | | 35 | 14.5 | | |

EXAMPLE 2

Polyguanidine-Based Image-Enhancing Compositions

The following table summarizes exemplary image-enhancing compositions in accordance with the invention, wherein the image-enhancing agent is a polyguanidine or an azetidinium polymer, or wherein the image-enhancing agent comprises a mixture of a polyguanidine and an azetidinium polymer.

TABLE 3

| Formulation No. | HS30 | Amres855 | VAN | PVOH | PC | Binder Polymer | Pigment | % Solids | Viscosity, cP |
|---|---|---|---|---|---|---|---|---|---|
| 4-63-3 | | 75.0 | | | | | 25[1] | 16.0 | |
| 4-57-4 | | 0.0 | 25.0 | 25.0 | | | 50[1] | 20.0 | |
| 4-62-2 | | 82.0 | 13.6 | 4.5 | | | | 12.8 | |
| 4-62-1 | | 64.2 | 10.7 | | | | 25[1] | 16.2 | |
| 4-63-2 | | 74.0 | 1.0 | | | | 25[1] | 16.2 | |
| 5-90-5 | | 50.0 | 3.0 | 10.0 | | | 35[2] | 14.9 | |
| 5-92-1 | | 45.0 | 4.0 | 10.0 | | 4Pole | 35[2] | 15.5 | |
| 5-92-2 | | 45.0 | 4.0 | 10.0 | | 4Pole | 35[2] | 12.9 | |
| 4-81-2 | 74.0 | | 1.0 | | | | 25[3] | 16.2 | |
| 4-83-1 | 72.0 | | 1.0 | | 2 | | 25[3] | 27.6 | |
| 4-84-1 | 72.0 | | 1.0 | | 2 | | 25[3] | 27.6 | 492 |
| 4-84-2 | 72.0 | | 1.0 | | 2 | | 25[3] | 23.0 | 265 |
| 4-85-1 | 72.0 | | 1.0 | | 2 | | 25[3] | 23.0 | 924 |

[1]mixture of 1:4 Sif:Sip
[2]mixture of 1:4 Sif:Sip and Jetcoat 20
[3]Jetcoat 20

TABLE 4

| Formulation No. | HS30 | Amres855 | ZrAc$_2$ | Vantocil | Poly172 | Kymene | Jetcoat20 | % Solids | Viscosity, cP |
|---|---|---|---|---|---|---|---|---|---|
| 45-10 | 69.0 | | | 2.0 | 29.1 | | | | 83 |
| 45-8 | 69.7 | | | 1.0 | 29.3 | | | | 82 |
| 28-4 | 35.2 | | 1.2 | | 33.9 | | 29.9 | 19.5 | 250 |
| 43-3 | 42.0 | | 1.5 | | | 42.8 | 13.6 | | 380 |
| 43-2 | 42.5 | | 1.5 | | | 42.2 | 13.8 | | 690 |
| 28-6 | 62.4 | | 0.4 | | 10.4 | | 26.4 | 24.8 | 800 |
| 32-9 | | 23.5 | 12.3 | | 64.2 | | 0.0 | | 240 |
| 37-2 | | 27.0 | 2.2 | | 62.6 | | 8.1 | | 200 |
| 31-9 | | 44.5 | 0.0 | | 44.5 | | 11.0 | | 140 |
| 36-1 | | 46.5 | 1.6 | | 45.9 | | 6.0 | | |
| 34-2 | | 46.5 | 1.5 | | 46.1 | | 6.0 | 14.0 | 500 |
| 28-5 | | 55.4 | 0.7 | | 21.2 | | 22.7 | 14.3 | 130 |
| 35-2 | | 55.4 | 1.4 | | 34.2 | | 5.3 | 13.0 | 160 |
| 43-1 | | 98.5 | 1.5 | | | | | | >1000 |

TABLE 5

POLYGUANIDINE-BASED COMPOSITIONS

| Formulation No. | Starch (Gum 280) | Azetidinium ("Amres") | Polyguanidine ("Vantocil") | Binder (PVOH) | Styrene/PVP ("Polectron") | Pigment 1:4 Sif:Sip | Solids (%) | Tinopal | pH |
|---|---|---|---|---|---|---|---|---|---|
| 46-2 | 45 | | 17 | 10 | | 28.0 | 14.2 | | |
| 79-3 | 45 | | 17 | 10 | | 28.0 | 17.6 | | 4.71 |
| 84-3 | 54 | 10 | 5 | 8 | | 22.5 | 15.2 | | |
| 84-2 | 60 | 10 | 5 | 5 | | 20.0 | 14.8 | | |
| 83-3 | 46 | 15 | 2 | 7 | | 30.0 | 16.4 | | |
| 83-2 | 40 | 20 | 3 | 7 | | 30.0 | 16.5 | | |
| 83-1 | 37 | 25 | 5 | 5 | | 28.0 | 16.4 | | |
| 73-1 | 10 | 50 | 5 | 10 | | 25.0 | 24.0 | | 3.94 |
| 73-2 | 35 | 5 | 5 | 10 | 10 | 35.0 | 18.1 | | 4.40 |
| 88-1 | 50 | 10 | 5 | 5 | | 30 | 14.5 | | 6.61 |
| 88-2 | 50 | 10 | 5 | 5 | | 30.0 | 14.5 | | 6.62 |
| 89-3 | 25 | 10 | 10 | 5 | 5 | 40 | 16.2 | 5.0 | |
| 89-2 | 38 | 12.4 | 4.8 | 9.5 | 4.8 | 28.6 | 14.3 | 1.90 | |
| 88-3 | 55 | 10 | 5 | 5 | | 23 | 14.0 | 2.0 | |
| 89-1 | 40 | 13 | 5 | 10 | | 30 | 13.8 | 2.0 | |
| 51-5 | 60 | | 40 | | | | 12.5 | | |
| 52-1 | 50 | | 50 | | | | 13.3 | | |
| 55-2 | | 71.4 | | 14.3 | | | 6.0 | | |
| 55-3 | | 85.5 | | 17.1 | | | 5.4 | | |
| 51-4 | | | 25 | 25 | | 50 | 20.0 | | |
| 53-4 | | 90 | 10 | | | | 6.0 | | |
| 53-1 | | 73.7 | 26.3 | | | | 4.8 | | |
| 53-2 | | 54.5 | 22.7 | 22.7 | | | 5.5 | | |
| 54-4 | | 71.4 | 14.3 | 14.3 | | | 6.6 | | |
| 57-1 | | 71 | 14 | 14 | | | 6.6 | | |

EXAMPLE 3

Evaluation of the Image-Enhancing Compositions

Each of the representative formulations prepared in Examples 1 and 2 was effective to produce a coated paper substrate and a sized paper substrate having the beneficial features described herein, i.e., with respect to bleeding, wicking and water-fastness of an image printed on the paper surface using a water-based inkjet ink and an inkjet printer. The formulations were also evaluated on (1) aluminum foil and other metal foil sheets, (2) cotton and cotton/polyester blend textile materials, (3) resin-coated paper (i.e., PVC-coated paper), and (4) latex-saturated paper. Each of the aforementioned substrates was coated with a formulation set forth in Tables 1 through 5 using a knife, a Meyer rod, or rollers, to achieve a coating thickness in the range of about 2 g/m$^2$ to 30 g/m$^2$. After coating and drying, the treated substrates were printed on using a water-based inkjet ink. The printed images were found to be water-fast as well as bleed-resistant and rub-resistant, and of superior quality with respect to both optical density and brightness.

What is claimed is:

1. A solid substrate having a surface suitable for printing on, prepared by the process comprising:

providing a solid substrate having an exposed surface; and directly applying a single image-enhancing composition to the exposed surface, wherein the image-enhancing composition comprises:

(a) an image-enhancing agent selected from the group consisting of
   (i) an acidic salt of a guanidine polymer comprised of monomer units having the structural formula (IV)

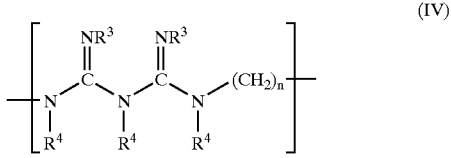

(IV)

wherein n is an integer in the range of 1 to 10 inclusive, $R^3$ is hydrogen or lower alkyl, and $R^4$ is hydrogen, alkyl, alkoxy, or hydroxyl-substituted alkoxy;

(ii) a mixture of an azetidinium polymer and an acidic salt of a guanidine polymer comprised of monomer units having the structural formula (IV); and (iii) a copolymer comprised of an azetidinium monomer unit and a guanidine monomer unit;

wherein the image-enhancing agent represents approximately 5 wt. % to 95 wt. % of the image-enhancing composition, based upon total solids weight of the composition after drying; and (b) approximately 1 wt. % to 40 wt. % of a film-forming binder composition based upon total solids weight of the composition after drying, in (c) a liquid vehicle.

2. The substrate of claim 1, wherein the image-enhancing composition is applied to the exposed surface as a coating on the substrate.

3. The substrate of claim 1, wherein application of the image-enhancing composition to the exposed surface of the substrate results in infiltration of the substrate with the composition.

4. The substrate of claim 1, wherein the substrate is comprised of an inorganic oxide.

5. The substrate of claim 1, wherein the substrate is metallic.

6. The substrate of claim 1, wherein the substrate comprises a laminate.

7. The substrate of claim 1, wherein the image-enhancing agent comprises an acidic salt of a guanidine polymer comprised of monomer units having the structure of formula (IV).

8. The substrate of claim 7, wherein the guanidine polymer is a homopolymer.

9. The substrate of claim 7, wherein the guanidine polymer is a copolymer.

10. The substrate of claim 7, wherein $R^3$ and $R^4$ are hydrogen.

11. The substrate of claim 1, wherein the image-enhancing agent comprises a mixture of an azetidinium polymer and an acidic salt of a guanidine polymer comprised of monomer units having the structural formula (IV).

12. The substrate of claim 11, wherein the azetidinium polymer is comprised of monomer units having the structural formula

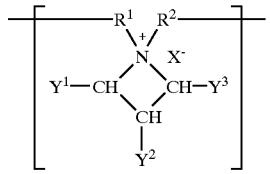

in which: $R^1$ and $R^2$ are independently lower alkylene; $X^-$ is an anionic, organic, or inorganic counterion; and $Y^1$, $Y^2$, and $Y^3$ are selected from the group consisting of hydrogen, hydroxyl, halo, alkoxy, alkyl, amino, carboxy, acetoxy, cyano, and sulfhydryl.

13. The substrate of claim 12, wherein: $R^1$ and $R^2$ are methylene; $X^-$ is selected from the group consisting of halide, acetate, methane sulfonate, succinate, citrate, malonate, fumarate, oxalate, and hydrogen sulfate; $Y^1$ and $Y^3$ are independently hydrogen or lower alkyl; and $Y^2$ is hydrogen or hydroxyl.

14. The substrate of claim 13, wherein, in the azetidinium polymer, $Y^1$ and $Y^3$ are hydrogen and $Y^2$ is hydroxyl.

15. The substrate of claim 13, wherein $R^3$ and $R^4$ are hydrogen.

16. The substrate of claim 1, wherein the image-enhancing agent is comprised of a copolymer of an azetidinium monomer unit and a guanidine monomer unit.

17. The substrate of claim 16, wherein the azetidinium monomer unit has the structural formula

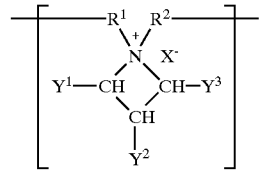

in which: $R^1$ and $R^2$ are independently lower alkylene; $X^-$ is an anionic, organic, or inorganic counterion; and $Y^1$, $Y^2$, and $Y^3$ are selected from the group consisting of hydrogen, hydroxyl, halo, alkoxy, alkyl, amino, carboxy, acetoxy, cyano, and sulfhydryl; and the guanidine monomer unit has the structural formula

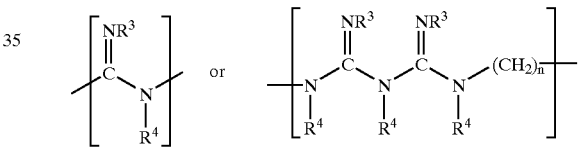

wherein n is an integer in the range of 1 to 10 inclusive; $R^3$ is hydrogen or lower alkyl; and $R^4$ is hydrogen, alkyl, alkoxy, or hydroxyl-substituted alkoxy.

18. The substrate of claim 17, wherein: $R^1$ and $R^2$ are methylene; $X^-$ is selected from the group consisting of halide, acetate, methane sulfonate, succinate, citrate, malonate, fumarate, oxalate, and hydrogen sulfate; $Y^1$ and $Y^3$ are independently hydrogen or lower alkyl; and $Y^2$ is hydrogen or hydroxyl.

19. The substrate of claim 1, wherein the liquid vehicle is aqueous.

20. The substrate of claim 1, wherein the film-forming binder represents approximately 1 wt. % to 25 wt. % of the image-enhancing composition, based upon total solids weight of the composition after drying.

21. The substrate of claim 1, wherein the film-forming binder is selected from the group consisting of polysaccharides, polypeptides, synthetic vinyl polymers, cationic film-forming binders, and derivatives thereof.

22. The substrate of claim 21, wherein the film-forming binder is a polysaccharide or a derivative thereof.

23. The substrate of claim 22, wherein the polysaccharide is starch.

24. The substrate of claim 22, wherein the polysaccharide is a cellulosic polymer.

25. The substrate of claim 22, wherein the polysaccharide is dextran.

26. The substrate of claim 21, wherein the film-forming binder is a polypeptide.

27. The substrate of claim 26, wherein the polypeptide is selected from the group consisting of collagen and gelatin.

28. The substrate of claim 21, wherein the film-forming binder is a synthetic vinyl polymer.

29. The substrate of claim 28, wherein the synthetic vinyl polymer is selected from the group consisting of poly(vinyl alcohol), poly(vinyl phosphate), poly(vinyl pyrrolidone), vinyl-pyrrolidone-vinyl acetate copolymers, vinyl alcohol-vinyl acetate copolymers, vinyl pyrrolidone-styrene copolymers, and poly(vinylamine).

30. The substrate of claim 29, wherein the synthetic vinyl polymer is a vinyl pyrrolidone-styrene copolymer.

31. The substrate of claim 29, wherein the synthetic vinyl polymer is poly(vinyl pyrrolidone).

32. The substrate of claim 21, wherein the film-forming binder is a cationic film-forming binder.

33. The substrate of claim 32, wherein the cationic film-forming binder is selected from the group consisting of quaternized vinyl pyrrolidone-dimethylaminoethyl-methacrylate copolymer, dimethylaminoethyl-methacrylate-co-methyl methacrylate, polydiallyldimethyl ammonium chloride, and quaternized aminoacrylate polymers.

34. A method for providing a water-resistant image on a substrate, comprising:

applying to the surface of a substrate an image-enhancing composition comprised of an image-enhancing agent selected from the group consisting of (a) an azetidinium polymer, (b) a guanidine polymer, (c) a mixture of an azetidinium polymer and a guanidine polymer, and (d) a copolymer of an azetidinium monomer and a guanidine monomer, to provide a treated substrate; and applying a dye composition to the treated substrate, wherein the dye composition contains a reactive dye having ionizable and/or nucleophilic groups capable of reacting with the image-enhancing agent.

35. A printed substrate prepared by the method of claim 34.

* * * * *